United States Patent
Sato

(10) Patent No.: US 11,561,740 B2
(45) Date of Patent: Jan. 24, 2023

(54) TERMINAL MANAGEMENT SYSTEM, TERMINAL MANAGEMENT PROGRAM, AND TERMINAL MANAGEMENT METHOD

(71) Applicant: BROTHER KOGYO KABUSHIKI KAISHA, Nagoya (JP)

(72) Inventor: Yutaro Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/586,791

(22) Filed: Jan. 28, 2022

(65) Prior Publication Data
US 2022/0247875 A1 Aug. 4, 2022

(30) Foreign Application Priority Data
Jan. 29, 2021 (JP) .............................. JP2021-013366

(51) Int. Cl.
*G06F 3/12* (2006.01)
*H04N 1/00* (2006.01)
*H04N 1/32* (2006.01)

(52) U.S. Cl.
CPC .......... *G06F 3/1203* (2013.01); *G06F 3/1206* (2013.01); *G06F 3/1224* (2013.01); *G06F 3/1237* (2013.01); *G06F 3/1245* (2013.01); *G06F 3/1247* (2013.01); *H04N 1/00206* (2013.01); *H04N 1/00344* (2013.01); *H04N 1/32545* (2013.01); *G06F 3/1229* (2013.01); *G06F 3/1236* (2013.01)

(58) Field of Classification Search
None
See application file for complete search history.

(56) References Cited

U.S. PATENT DOCUMENTS

| | | | |
|---|---|---|---|
| 8,319,994 B2* | 11/2012 | Yamamoto | H04N 1/00307 358/1.15 |
| 2003/0172308 A1 | 9/2003 | Imai | |
| 2010/0195144 A1* | 8/2010 | Kawai | G06F 3/1222 358/1.15 |

(Continued)

FOREIGN PATENT DOCUMENTS

JP   2003-330823 A   11/2003

*Primary Examiner* — Miya J Williams
(74) *Attorney, Agent, or Firm* — Kenealy Vaidya LLP

(57) ABSTRACT

A terminal management system includes a main management device, a sub-management device, a first type terminal device that is communicably connected to the sub-management device, a second type terminal device that is not communicably connected to the main management device and the sub-management device, and a storage device that is configured to communicate with the main management device, the sub-management device, and the second type terminal device. The main management device uploads, to the storage device, first processing instruction information and second processing instruction information. The sub-management device downloads the first processing instruction information and uploads first notification information after the first type terminal device executes a first target processing. The second type terminal device downloads the second processing instruction information from the storage device, and uploads second notification information after the second type terminal device executes a process.

7 Claims, 13 Drawing Sheets

(56) References Cited

U.S. PATENT DOCUMENTS

| | | | |
|---|---|---|---|
| 2011/0216357 A1* | 9/2011 | Kouno | G06F 3/12 |
| | | | 358/1.15 |
| 2015/0277820 A1* | 10/2015 | Anezaki | G06F 3/1273 |
| | | | 358/1.15 |
| 2016/0216920 A1* | 7/2016 | Zakharov | G06F 3/1203 |
| 2018/0225556 A1* | 8/2018 | Fukami | G06K 15/1805 |
| 2021/0212164 A1* | 7/2021 | Nishizaki | G06F 3/1209 |

* cited by examiner

FIG. 8

```
{
  "ScheduleParameterList": [
    {
      "start_time": "2020-12-18T13:51:50"
    }
  ],
  "DeviceActionScenarioId": 1,
  "ApplicationId": 0,
  "ActionTypeMainId": 1,      ----R1
  "ActionTypeSubId": 1,
  "ActionParameter": "{¥r¥n
¥"instant_task¥": {
  ¥"network¥": null,
  ¥"usb¥": null,
  ¥"common¥": {
    ¥"setting_file¥": {                                    ,-R2
      ¥"setting_file¥": ¥"XXXX¥¥setting.txt¥",
      ¥"txt_password¥": ¥"******¥"
    },
    ¥"add_device¥": null,
         .
         .
         .
```

TERMINAL MANAGEMENT SYSTEM, TERMINAL MANAGEMENT PROGRAM, AND TERMINAL MANAGEMENT METHOD

CROSS REFERENCE TO RELATED APPLICATIONS

This application is based on Japanese Patent Applications No. 2021-013366 filed on Jan. 29, 2021, the entire contents of which are incorporated herein by reference.

BACKGROUND

The present disclosure relates to a technique for managing a terminal device.

A related art document discloses a management system including a mediation device that is connected to one or a plurality of image forming devices in a local network provided with a firewall, and a management device that is connected to the mediation device via the Internet and remotely manages the image forming devices in the local network.

A terminal management system in which a management device manages a terminal device such as an image forming device may have a mixed configuration of a configuration in which the management device manages the terminal device via a mediation device (hereinafter, referred to as a mediation management configuration) and a configuration in which the management device manages the terminal device without using the mediation device (hereinafter, referred to as a non-mediation management configuration).

An object of the present disclosure is to facilitate the construction of a terminal management system having a mixed configuration of a mediation management configuration and a non-mediation management configuration.

SUMMARY

According to an aspect of the present disclosure, there is provided a terminal management system that manages a terminal device. The terminal management system includes a main management device, a sub-management device, a first type terminal device, a second type terminal device, and a storage device. The first type terminal device is a terminal device communicably connected to the sub-management device. The second type terminal device is a terminal device that is not communicably connected to the main management device and the sub-management device. The storage device is configured to communicate with the main management device, the sub-management device, and the second type terminal device.

The main management device uploads, to the storage device, first processing instruction information indicating contents of a processing to be executed by the first type terminal device, and uploads, to the storage device, second processing instruction information indicating contents of a processing to be executed by the second type terminal device.

The sub-management device downloads the first processing instruction information from the storage device, causes the first type terminal device to execute a first target processing that is a processing indicated by the first processing instruction information, and uploads, to the storage device, first notification information indicating notification contents corresponding to the first target processing after the first type terminal device executes the first target processing.

The second type terminal device downloads the second processing instruction information from the storage device, executes a second target processing that is a processing indicated by the second processing instruction information, and uploads, to the storage device, second notification information indicating notification contents corresponding to the second target processing after the second target processing is executed.

The main management device downloads the first notification information and the second notification information from the storage device. The main management device makes an instruction format different between the first processing instruction information and the second processing instruction information.

In the terminal management system according to the present disclosure configured as described above, the main management device may upload the first processing instruction information to the sub-management device in an instruction format corresponding to the sub-management device, and may upload the second processing instruction information to the second type terminal device in an instruction format corresponding to the second type terminal device. Therefore, the terminal management system according to the present disclosure does not need to change the instruction format in the sub-management device or the second type terminal device in order to match the instruction format of the sub-management device with the instruction format of the second type terminal device. Accordingly, the terminal management system according to the present disclosure may facilitate the construction of a terminal management system having a mixed configuration of a configuration in which the main management device manages the terminal device via the sub-management device and a configuration in which the main management device manages the terminal device without using the sub-management device.

According to another aspect of the present disclosure, there is provided a terminal management program configured to cause a controller provided in a main management device of a terminal management system to execute a first upload processing and a second upload processing.

The first upload processing is a processing of uploading, to the storage device, first processing instruction information that indicates contents of a processing to be executed by a first type terminal device and is downloaded from the storage device by a sub-management device.

The second upload processing is a processing of uploading, to the storage device, second processing instruction information that indicates contents of a processing to be executed by a second type terminal device, is downloaded from the storage device by the second type terminal device, and has an instruction format different from an instruction format of the first processing instruction information.

A computer controlled by the terminal management program according to the present disclosure may be a constituent element of the terminal management system according to the present disclosure, and may obtain the same effects as the terminal management system according to the present disclosure.

According to another aspect of the present disclosure, there is provided a terminal management method to be executed by a main management device of a terminal management system. The terminal management method includes a first upload step and a second upload step. The terminal management method according to the present disclosure configured as described above is a method to be executed by the terminal management system according to the present disclosure, and the same effects as those of the terminal management system according to the present disclosure may be obtained by executing the terminal management method.

BRIEF DESCRIPTION OF DRAWINGS

FIG. 8 is a diagram showing a specific example of a character string stored in a property "Notify Parameter".

DESCRIPTION OF EMBODIMENTS

Figure 1:
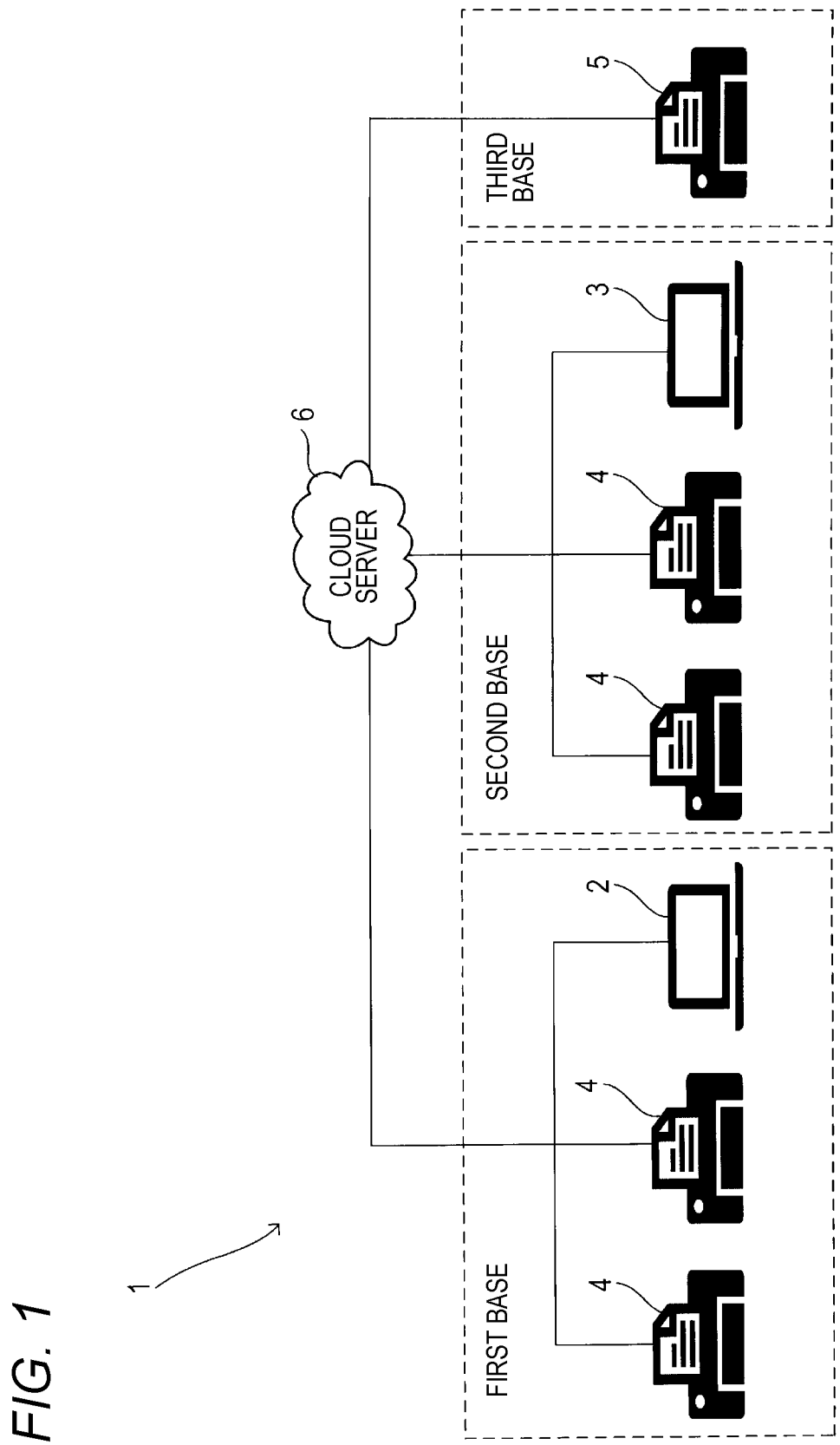
FIG. 1 is a block diagram showing a configuration of a management system.

Hereinafter, embodiments of the present disclosure will be described with reference to the drawings.

(1) Overall Configuration

A management system 1 according to an embodiment of the present disclosure is a network system configured to manage, via a cloud server 6, terminal devices 4 and 5 that are disposed in a plurality of bases, in cooperation with a master 2 and a client 3.

The master 2 shown in FIG. 1 may communicate, via a local area network, with the terminal device 4 installed in a first base. Further, the master 2 may communicate with the cloud server 6 via a wide area network.

The client 3 may communicate, via a local area network, with the terminal device 4 installed in a second base. Further, the client 3 may communicate with the cloud server 6 via a wide area network. The terminal device 5 installed in a third base may communicate with the cloud server 6 via a wide area network.

The local area network may include, for example, at least one of a wireless LAN and a wired LAN. The wide area network may include, for example, the Internet. A local area network may be constructed in the third base. In this case, the terminal device 5 may be connected to a wide area network via the local area network in the third base.

The terminal device 4 is not capable of using a cloud service provided by the cloud server 6. In other words, the terminal device 4 does not have a function of communicating with the cloud server 6. Hereinafter, the terminal device 4 is particularly referred to as a first type terminal device 4. On the other hand, the terminal device 5 is a terminal device that may use a cloud service provided by the cloud server 6.

In other words, the terminal device 5 has a function of communicating with the cloud server 6. Hereinafter, the terminal device 5 is particularly referred to as a second type terminal device 5.

The first type terminal device 4 installed in the second base is managed by the master 2 via the client 3 and the cloud server 6. The second type terminal device 5 installed in the third base is managed by the master 2 via the cloud server 6 but not via the client 3.

The terminal devices 4 and 5 managed by the master 2 may be, for example, a group of terminal devices managed by an organization such as a company. In this case, each base may be an activity base of an organization. For example, the first base where the master 2 is present may be an office of an organization management department. The other second and third bases may be branch offices of organizations separated from the first base.

Examples of the terminal devices 4 and 5 include a printer, a scanner, and a digital multifunction device in which these functions are integrated. The master 2 and the client 3 are implemented, for example, by installing a dedicated computer program in a personal computer.

(2) Device Configuration

Figure 2:
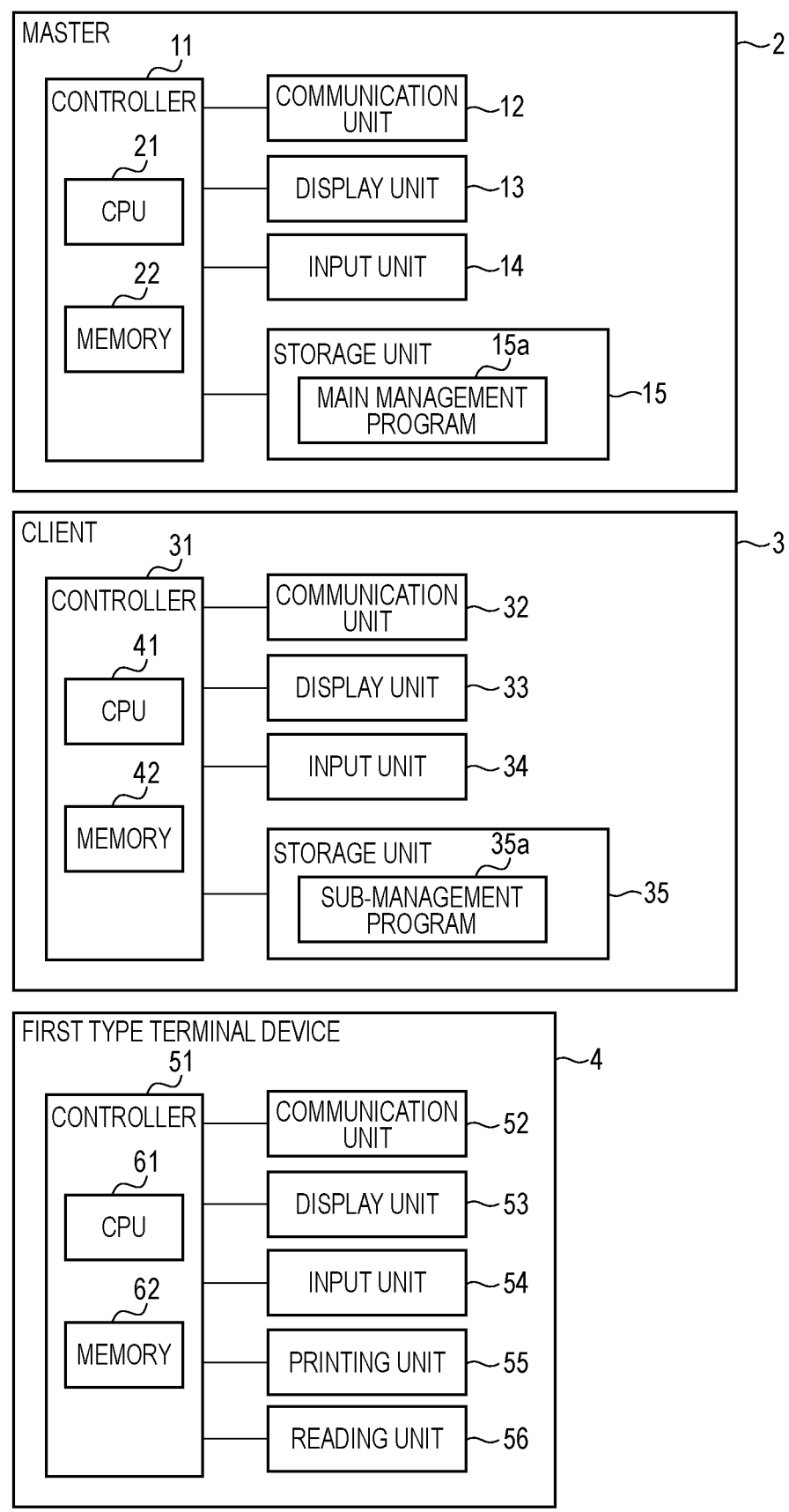
FIG. 2 is a block diagram showing configurations of a master, a client, and a first type terminal device.

As shown in FIG. 2, the master 2 includes a controller 11, a communication unit 12, a display unit 13, an input unit 14, and a storage unit 15. The controller 11 includes a CPU 21 and a memory 22. The CPU 21 serving as a processor executes a processing in accordance with a computer program stored in the storage unit 15. The memory 22 is used as a work memory when the above processing is executed.

The storage unit 15 includes, for example, a storage such as a solid state drive and a hard disk drive, and stores various computer programs and data. The storage unit 15 stores a main management program 15a. The main management program 15a is a computer program for causing the CPU 21 to implement a management function to be implemented by the master 2. It may be understood that a processing mainly executed by the controller 11 is achieved by a processing executed by the CPU 21 in accordance with a computer program in the following description.

The communication unit 12 is connected to a local area network in a base where the master 2 is present, and is further connected to a wide area network. The communication unit 12 may be connected to a wide area network via a router (not shown). The display unit 13 is configured to display various screens for a user who operates the master 2. An example of the display unit 13 includes a liquid crystal display. Examples of the various screens include a screen for displaying log information and status information of the terminal devices 4 and 5 to be managed, and a screen for remotely operating the terminal devices 4 and 5 in accordance with an operation signal from the user.

The input unit 14 includes one or more input devices for inputting an operation signal from the user who operates the master 2, such as a keyboard and a pointing device. The controller 11 operates in accordance with an operation signal input via the input unit 14.

The client 3 includes a controller 31, a communication unit 32, a display unit 33, an input unit 34, and a storage unit 35. The controller 31 includes a CPU 41 and a memory 42. The CPU 41 serving as a processor executes a processing in accordance with a computer program stored in the storage unit 35.

The storage unit 35 stores a sub-management program 35a. The sub-management program 35a is a computer program for causing the CPU 41 to implement a function related to a management function of the master 2 to be implemented by the client 3. It may be understood that a processing mainly executed by the controller 31 is achieved by a processing executed by the CPU 41 in accordance with a computer program in the following description.

The communication unit 32 is connected to a local area network in a base where the client 3 is present, and is further connected to a wide area network. The communication unit 32 may be connected to a wide area network via a router (not shown). The display unit 33 includes, for example, a liquid crystal display, and is configured to display various screens for a user who operates the client 3. The input unit 34 includes one or more input devices for inputting an operation signal from a user who operates the client 3. The controller 31 operates in accordance with an operation signal input via the input unit 34.

The first type terminal device 4 includes a controller 51, a communication unit 52, a display unit 53, and an input unit 54. When the first type terminal device 4 is a digital multifunction device, the first type terminal device 4 may further include a printing unit 55 and a reading unit 56. The first type terminal device 4 may include only one of the printing unit 55 and the reading unit 56.

The controller 51 includes a CPU 61 and a memory 62. The memory 62 may include a nonvolatile memory such as a flash memory in addition to a RAM, and may store a computer program, setting data, and the like in the nonvolatile memory.

The CPU 61 serving as a processor executes overall control of the entire first type terminal device by executing a processing according to a computer program stored in the memory 62. It may be understood that a processing mainly executed by the controller 51 is achieved by a processing executed by the CPU 61 in accordance with a computer program in the following description.

The communication unit 52 is connected to a local area network in a base where the first type terminal device 4 is present, so that the communication unit 52 may communicate with the master 2 or the client 3 present in the local area network. The display unit 53 includes, for example, a liquid crystal display, and is configured to display various screens for a user who operates the first type terminal device 4. The input unit 54 includes one or more input devices such as a touch panel on a liquid crystal display in order to input an operation signal from a user.

The printing unit 55 is configured to print an image on a sheet under the control of the controller 51. Examples of the printing unit 55 include an inkjet printer and a laser printer. According to the present embodiment, status information such as a remaining amount of a color material and log information such as the number of printed sheets are provided from the first type terminal device 4 to the master 2 via the client 3 and the cloud server 6 by a method to be described later. The reading unit 56 is configured to read a reading target such as a printed matter under the control of the controller 51.

Figure 3:
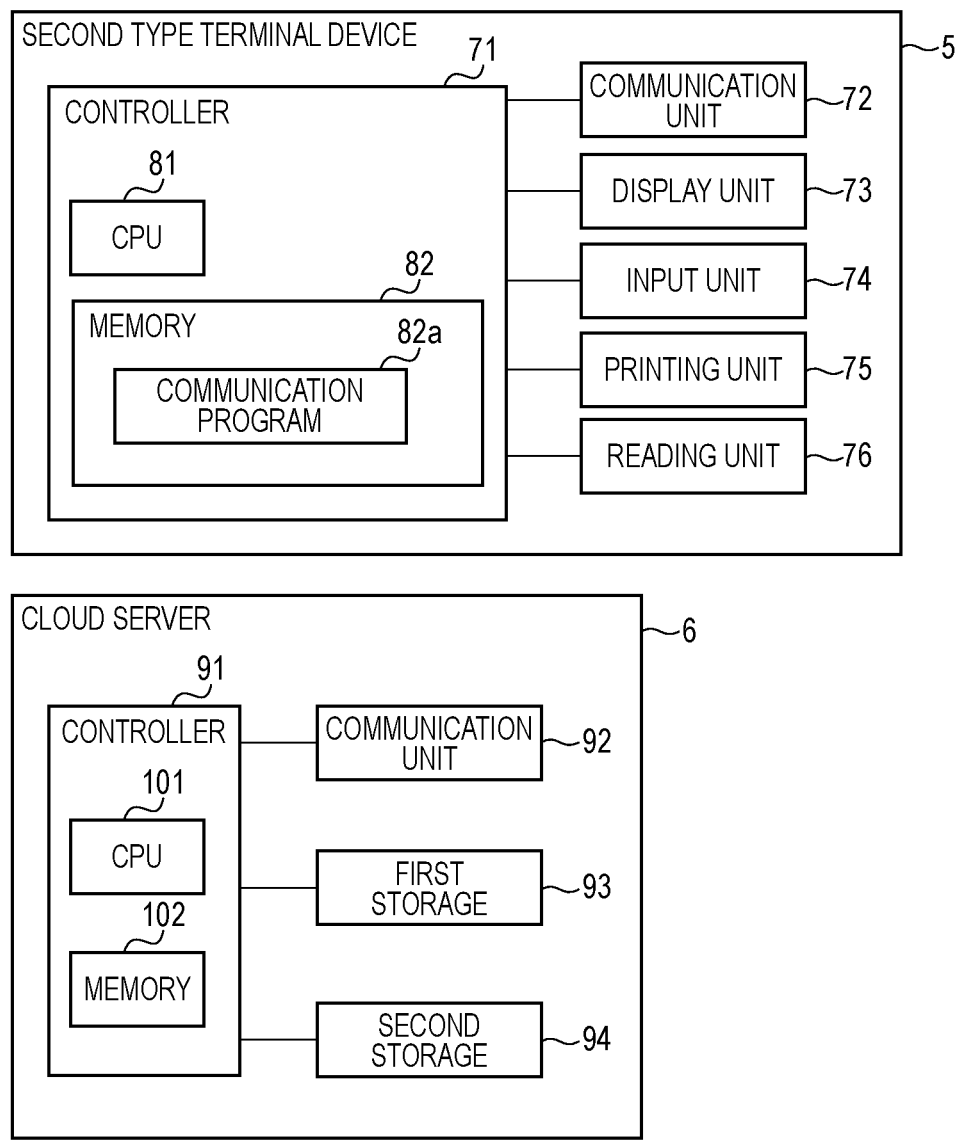
FIG. 3 is a block diagram showing a configuration of a second type terminal device and a client server.

As shown in FIG. 3, the second type terminal device 5 includes a controller 71, a communication unit 72, a display unit 73, and an input unit 74. When the second type terminal device 5 is a digital multifunction device, the second type terminal device 5 may further include a printing unit 75 and a reading unit 76. The second type terminal device 5 may include only one of the printing unit 75 and the reading unit 76.

The controller 71 includes a CPU 81 and a memory 82. The memory 82 may include a nonvolatile memory such as a flash memory, and may store a computer program, setting data, and the like in the nonvolatile memory.

The CPU 81 serving as a processor executes overall control of the entire device by executing a processing in accordance with a computer program stored in the memory 82. The memory 82 stores a communication program 82a. The communication program 82a is a program for using a cloud service provided by the cloud server 6. It may be understood that a processing mainly executed by the controller 71 is achieved by a processing executed by the CPU 81 in accordance with a computer program in the following description.

The communication unit 72 is connected to a wide area network, so that the communication unit 72 may communicate with the cloud server 6. When a local area network is constructed in the third base, the communication unit 72 may be connected to a wide area network via the local area network. The display unit 73 includes, for example, a liquid crystal display. The input unit 74 includes one or more input devices for inputting an operation signal from a user.

The printing unit 75 is configured to print an image on a sheet under the control of the controller 71. According to the present embodiment, status information such as a remaining amount of a color material and log information such as the number of printed sheets are provided from the second type terminal device 5 to the master 2 via the cloud server 6 by a method to be described later. The reading unit 76 is configured to read a reading target such as a printed matter under the control of the controller 71.

The cloud server 6 includes a controller 91, a communication unit 92, a first storage 93, and a second storage 94. The controller 91 includes a CPU 101 and a memory 102. The CPU 101 serving as a processor executes a processing in accordance with a computer program stored in the memory 102. A processing executed by the CPU 101 includes a processing for causing the cloud server 6 to function as a cloud storage. It may be understood that a processing mainly executed by the controller 91 is achieved by a processing executed by the CPU 101 in accordance with a computer program in the following description.

The cloud storage includes a table storage and an object storage. The controller 91 executes the processing described above, so that the first storage 93 functions as a table storage and the second storage 94 functions as an object storage.

The first storage 93 functions as a NoSQL data store, and may store a table having a group of schema-less entities as constituent elements. Each entity in the table includes a set of properties.

The second storage 94 functions as an object storage in which a text file and a binary file may be read and written as objects from the outside by using the HTTP/HTTPS protocol.

Azure of Microsoft Corporation is known as a cloud service that provides the table storage and the object storage described above. The cloud server 6 may operate in the same manner as such a cloud service. "Azure" is a registered trademark of Microsoft Corporation.

(3) Instant Task

Next, a procedure of an instant task instruction processing executed by the controller 11 of the master 2 will be described. The instant task instruction processing is executed in response to an input operation performed via the input unit 14 for the purpose of designating a terminal device for executing an instant task and contents of the instant task.

Figure 4:
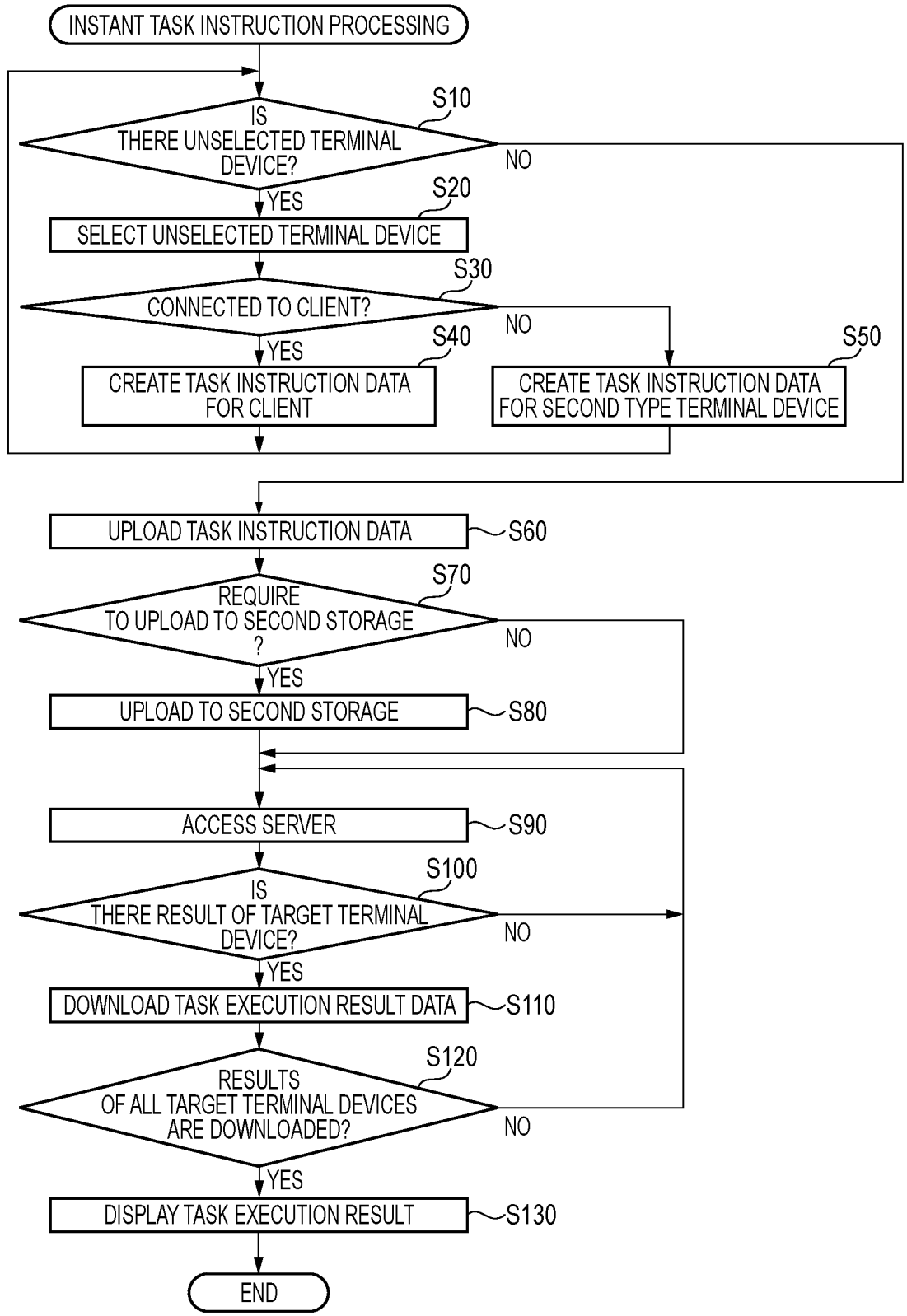
FIG. 4 is a flowchart showing an instant task instruction processing.

When the instant task instruction processing is to be executed, before the instant task instruction processing is started, the CPU 21 of the controller 11 first determines in S10 whether there is a terminal device that is not selected in the processing of S20 to be described later (hereinafter, referred to as an unselected terminal device) among all terminal devices designated by the input operation, as shown in FIG. 4.

When there is no unselected terminal device, the CPU 21 proceeds the processing to S60. On the other hand, when there is an unselected terminal device, the CPU 21 selects one unselected terminal device in S20.

In S30, the CPU 21 determines whether the terminal device selected in S20 is connected to the client 3 based on the terminal device database stored in the storage unit 15. The terminal device database stores information indicating whether a terminal device is connected to the client 3 for all terminal devices managed by the management system 1.

Here, when the selected terminal device is connected to the client 3, the CPU 21 creates instant task instruction data for a client in S40, and proceeds the processing to S10. On the other hand, when the selected terminal device is not connected to the client 3, the CPU 21 creates instant task instruction data for the second type terminal device in S50, and proceeds the processing to S10. An instruction format of the instant task instruction data for the client and an instruction format of the instant task instruction data for the second type terminal device will be described later.

In S60, the CPU 21 uploads the instant task instruction data of all designated terminal devices to the first storage 93 of the cloud server 6. In S70, the CPU 21 determines whether the task is a task that requires uploading of the instant task instruction data to the second storage 94 based on contents of the instant task input via the input unit 14 before the instant task instruction processing is started. When the task is not a task that requires uploading of the instant task instruction data to the second storage 94, the CPU 21 proceeds the processing to S90. On the other hand, when the task is a task that requires uploading of the instant task instruction data to the second storage 94, the CPU 21 uploads file data necessary for executing the task to the second storage 94 in S80, and proceeds the processing to S90.

In S90, the CPU 21 accesses the cloud server 6. In S100, the CPU 21 determines whether task execution result data of the terminal device (hereinafter, referred to as a target terminal device) designated by the input operation before the instant task instruction processing is started is uploaded to the first storage 93 of the cloud server 6.

When the task execution result data of the target terminal device is not uploaded, the CPU 21 proceeds the processing to S90. On the other hand, when the task execution result data of the target terminal device is uploaded, the CPU 21 downloads the task execution result data of the target terminal device from the first storage 93 in S110.

In S120, the CPU 21 determines whether the task execution result data of all target terminal devices is downloaded. When the task execution result data of all target terminal devices is not downloaded, the CPU 21 proceeds the processing to S90. On the other hand, when the task execution result data of all target terminal devices is downloaded, in S130, the CPU 21 displays a task execution result of all target terminal devices on a display screen of the display unit 13 based on the downloaded task execution result data, and ends the instant task instruction processing.

Next, a procedure of a first instant task execution processing executed by the controller 31 of the client 3 will be described. The first instant task execution processing is a processing repeatedly executed during the operation of the client 3.

Figure 5:
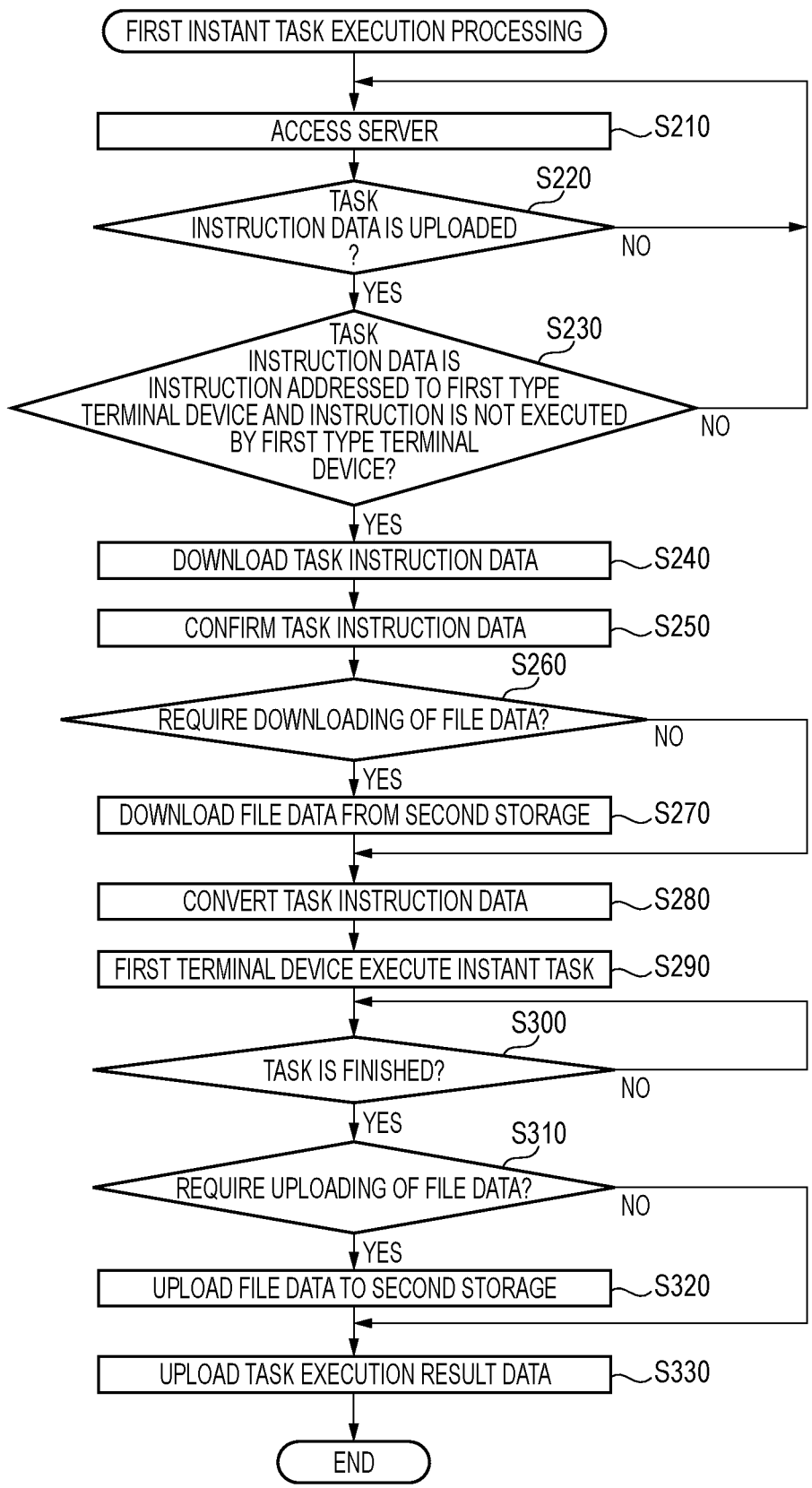
FIG. 5 is a flowchart showing a first instant task execution processing.

When the first instant task execution processing is executed, the CPU 41 of the controller 31 first accesses the cloud server 6 in S210 as shown in FIG. 5. In S220, the CPU 41 determines whether the instant task instruction data is uploaded to the first storage 93.

When the instant task instruction data is not uploaded, the CPU 41 proceeds the processing to S210. On the other hand, when the instant task instruction data is uploaded, in S230, the CPU 41 determines whether the uploaded instant task instruction data is an instruction addressed to the first type terminal device 4 connected to the client 3 and whether the uploaded instant task instruction data is an instruction that is not executed by the first type terminal device 4 connected to the client 3.

Here, when the uploaded instant task instruction data is not an instruction addressed to the first type terminal device 4 connected to the client 3 or the uploaded instant task instruction data is an instruction executed by the first type terminal device 4 connected to the client 3, the CPU 41 proceeds the processing to S210.

On the other hand, when the uploaded instant task instruction data is an instruction addressed to the first type terminal device 4 connected to the client 3 and the uploaded instant task instruction data is an instruction that is not executed by the first type terminal device 4 connected to the client 3, the CPU 41 downloads the instant task instruction data uploaded to the first storage 93 in S240.

In S250, the CPU 41 confirms contents of the downloaded instant task instruction data. In S260, the CPU 41 determines whether the downloaded instant task instruction data is an instruction that requires downloading of file data, based on a confirmation result in S250.

When the downloaded instant task instruction data is not an instruction that requires downloading of file data, the CPU 41 proceeds the processing to S280. On the other hand, when the downloaded instant task instruction data is an instruction that requires downloading of file data, in S270, the CPU 41 downloads file data from the second storage 94 of the cloud server 6 based on the confirmation result in S250, and proceeds the processing to S280.

In S280, the CPU 41 converts the downloaded instant task instruction data into a format that may be recognized by the first type terminal device 4. Specifically, the CPU 41 converts the instant task instruction data into a message that may be transmitted to and received by an SNMP protocol. Such a message includes an object ID of a MIB in order to identify instruction contents. The MIB is an abbreviation for Management Information Base.

When the file data is downloaded from the second storage 94 of the cloud server 6, the CPU 41 rewrites a storage location of the file data in the downloaded instant task instruction data into a storage location in the storage unit 35 of the client 3.

Next, in S290, the CPU 41 transmits the message obtained by converting the instant task instruction data to the first type terminal device 4 that is a target indicated by the downloaded instant task instruction data. Accordingly, the first type terminal device 4 that is a target indicated by the downloaded instant task instruction data executes the instant task.

In S300, the CPU 41 determines whether the first type terminal device 4 finishes the instant task when the CPU 41 receives the message from the first type terminal device 4 using the SNMP protocol.

Here, when the first type terminal device 4 does not finish the instant task, the processing in S300 is repeated until the first type terminal device 4 finishes the instant task. When the first type terminal device 4 finishes the instant task, the CPU 41 determines whether the instant task is a task that requires uploading of file data in S310.

When the instant task is not a task that requires uploading of the file data, the CPU 41 proceeds the processing to S330. On the other hand, when the instant task is a task that requires uploading of the file data, in S320, the CPU 41 uploads the file data generated by executing the instant task by the first type terminal device 4 to the second storage 94 of the cloud server 6, and proceeds the processing to S330.

In S330, the CPU 41 uploads instant task execution result data indicating a result of the execution of the instant task by the first type terminal device 4 to the first storage 93 of the cloud server 6, and ends the first instant task execution processing.

Next, a procedure of a second instant task execution processing executed by the controller 71 of the second type terminal device 5 will be described. The second instant task execution processing is a processing repeatedly executed during the operation of the second type terminal device 5.

Figure 6:
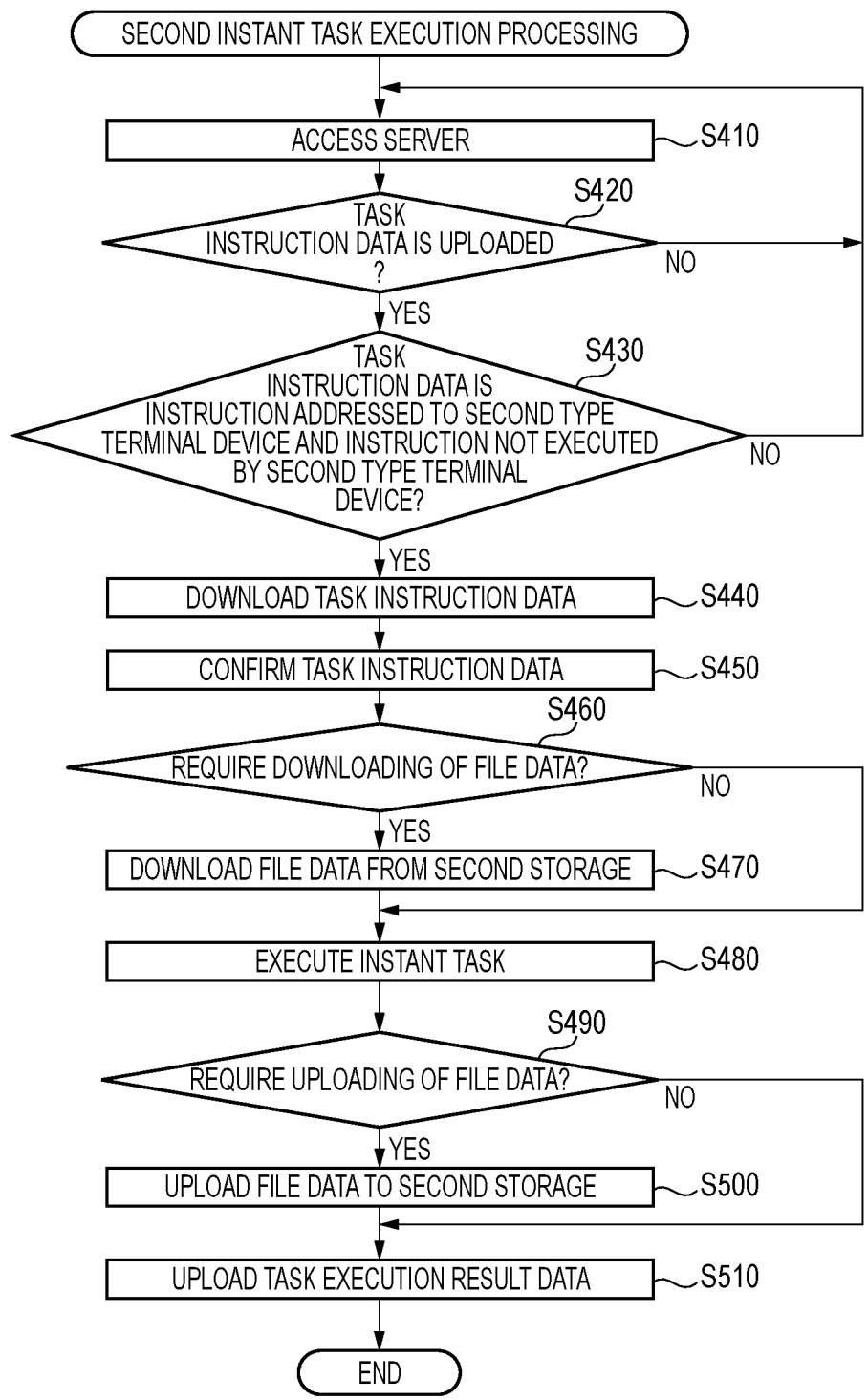
FIG. 6 is a flowchart showing a second instant task execution processing.

When the second instant task execution processing is executed, the CPU 81 of the controller 71 first accesses the cloud server 6 in S410 as shown in FIG. 6. In S420, the CPU 81 determines whether the instant task instruction data is uploaded to the first storage 93. When the instant task instruction data is not uploaded, the CPU 81 proceeds the processing to S410. On the other hand, when the instant task instruction data is uploaded, in S430, the CPU 81 determines whether the uploaded instant task instruction data is an instruction addressed to the second type terminal device 5 and whether the uploaded instant task instruction data is an instruction that is not executed by the second type terminal device 5.

When the uploaded instant task instruction data is not an instruction addressed to the second type terminal device 5 or the upload instant task instruction data is an instruction executed by the second type terminal device 5, the CPU 81 proceeds the processing to S410.

On the other hand, when the uploaded instant task instruction data is an instruction addressed to the second type terminal device 5 and the uploaded instant task instruction data is an instruction that is not executed by the second type terminal device 5, in S440, the CPU 81 downloads the task instruction data uploaded to the first storage 93.

In S450, the CPU 81 confirms contents of the downloaded instant task instruction data. In S460, the CPU 81 determines whether the downloaded task instruction data is an instruction that requires downloading of file data, based on a confirmation result in S450.

When the downloaded task instruction data is not an instruction that requires downloading of file data, the CPU 81 proceeds the processing to S480. On the other hand, when the downloaded task instruction data is an instruction that requires downloading of file data, in S470, the CPU 81 downloads the file data from the second storage 94 of the cloud server 6 based on the confirmation result in S450, and proceeds the processing to S480.

In S480, the CPU 81 executes the instant task specified by the downloaded instant task instruction data. In S490, the CPU 81 determines whether the instant task that was executed is a task that requires uploading of file data.

When the instant task is not a task that requires uploading of the file data, the CPU 81 proceeds the processing to S510. On the other hand, when the instant task is a task that requires uploading of the file data, in S500, the CPU 81 uploads the file data generated by executing the instant task to the second storage 94 of the cloud server 6, and proceeds the processing to S510.

In S510, the CPU 81 uploads instant task execution result data indicating a result of the execution of the instant task by the second type terminal device 5 to the first storage 93 of the cloud server 6, and ends the second instant task execution processing.

Figure 7:
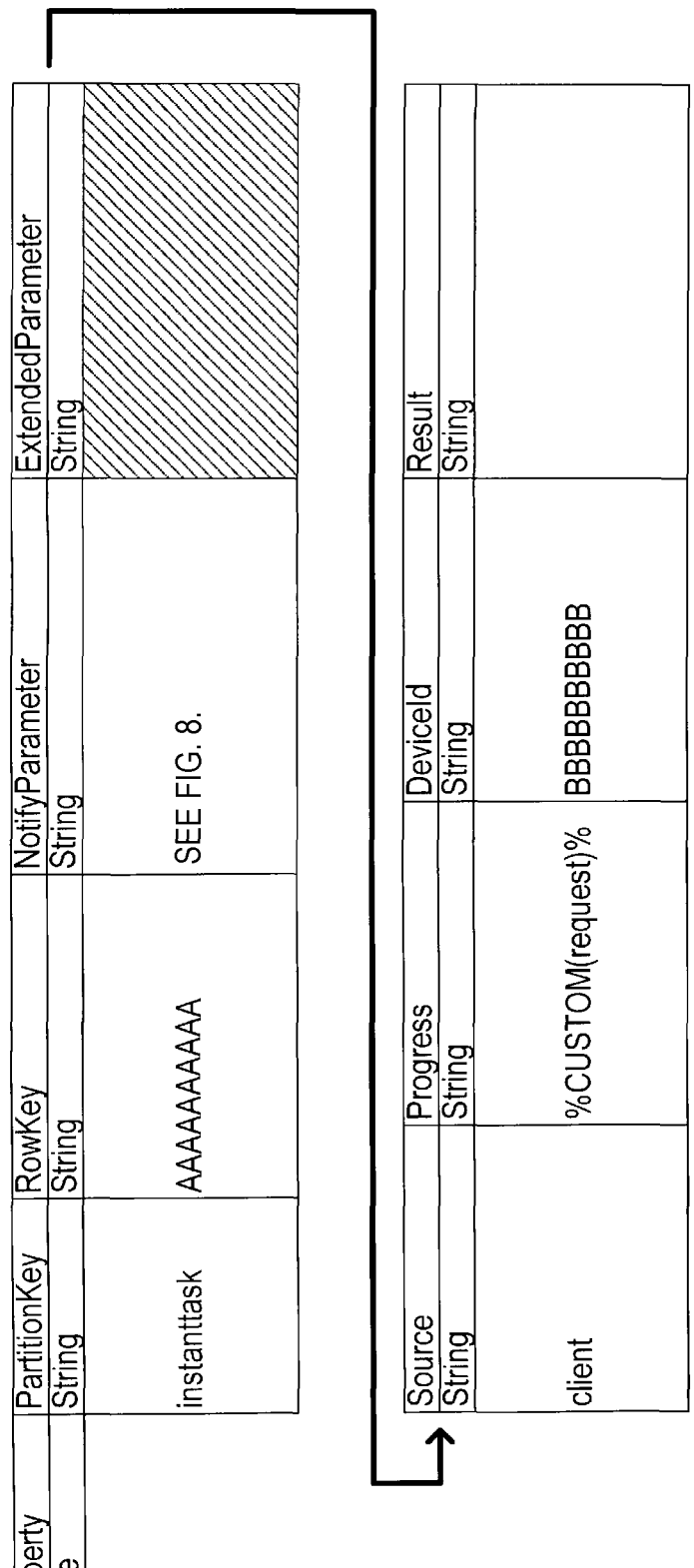
FIG. 7 is a diagram showing a first specific example of instant task instruction data.

FIG. 7 shows a specific example of the instant task instruction data created when the master 2 instructs the client 3 to execute an instant task. As shown in FIG. 7, the instant task instruction data is a template including a plurality of properties, and a character string is stored in each of the plurality of properties.

In the instant task instruction data shown in FIG. 7, "Partition Key", "Row Key", "Notify Parameter", "Extended Parameter", "Source", "Progress", "Device Id", and "Result" are set as properties.

In the property "Partition Key", a character string indicating a type of a task is stored. In the instant task instruction data shown in FIG. 7, "instant task" that is a character string indicating an instant task is stored in the property "Partition Key".

A transaction ID for identifying instant task instruction data is stored in the property "Row Key". A character string described in a JSON format for indicating instruction contents of an instant task is stored in the property "Notify Parameter". A specific example of the character string stored in the property "Notify Parameter" is shown in FIG. 8.

As shown in FIG. 8, the instruction contents of an instant task are designated by a combination of an action type main ID "ActionTypeMainId" and an action type sub ID "ActionTypeSubId" in a rectangle R1 of a broken line. A storage location of file data is designated in a rectangle R2 of a broken line. Although a file extension of the file data described in the rectangle R2 is ".txt", the file extension may be ".bin", ".json", or the like. The file data may be encrypted.

As shown in FIG. 7, the property "Extended Parameter" is not used and is blank. A character string indicating whether an instruction acquisition destination is the client 3 or the second type terminal device 5 is stored in the property "Source". Specifically, when the instruction acquisition destination is the client 3, "client" that is a character string indicating the client 3 is stored, and when the instruction acquisition destination is the second type terminal device 5, "device" that is a character string indicating the second type terminal device 5 is stored.

A character string indicating an instruction progress status is stored in the property "Progress". Specifically, "% CUSTOM (request) %" indicating that the execution of an instruction is requested, "% CUSTOM (processing) %" indicating that the instruction is being executed, or "% CUSTOM (done) %" indicating that the execution of the instruction is completed is stored in the property "Progress". "% CUSTOM (request) %" is stored by the master 2, and "% CUSTOM (processing) %" and "% CUSTOM (done) %" are stored by the client 3 or the second type terminal device 5.

A device ID for identifying the first type terminal device 4 or the second type terminal device 5 that is an instruction destination is stored in the property "Device Id". A character string indicating an execution result of the instant task is stored in the property "Result". That is, a character string indicating the execution result is stored in the property "Result" by the client 3 or the second type terminal device 5.

Figure 9:
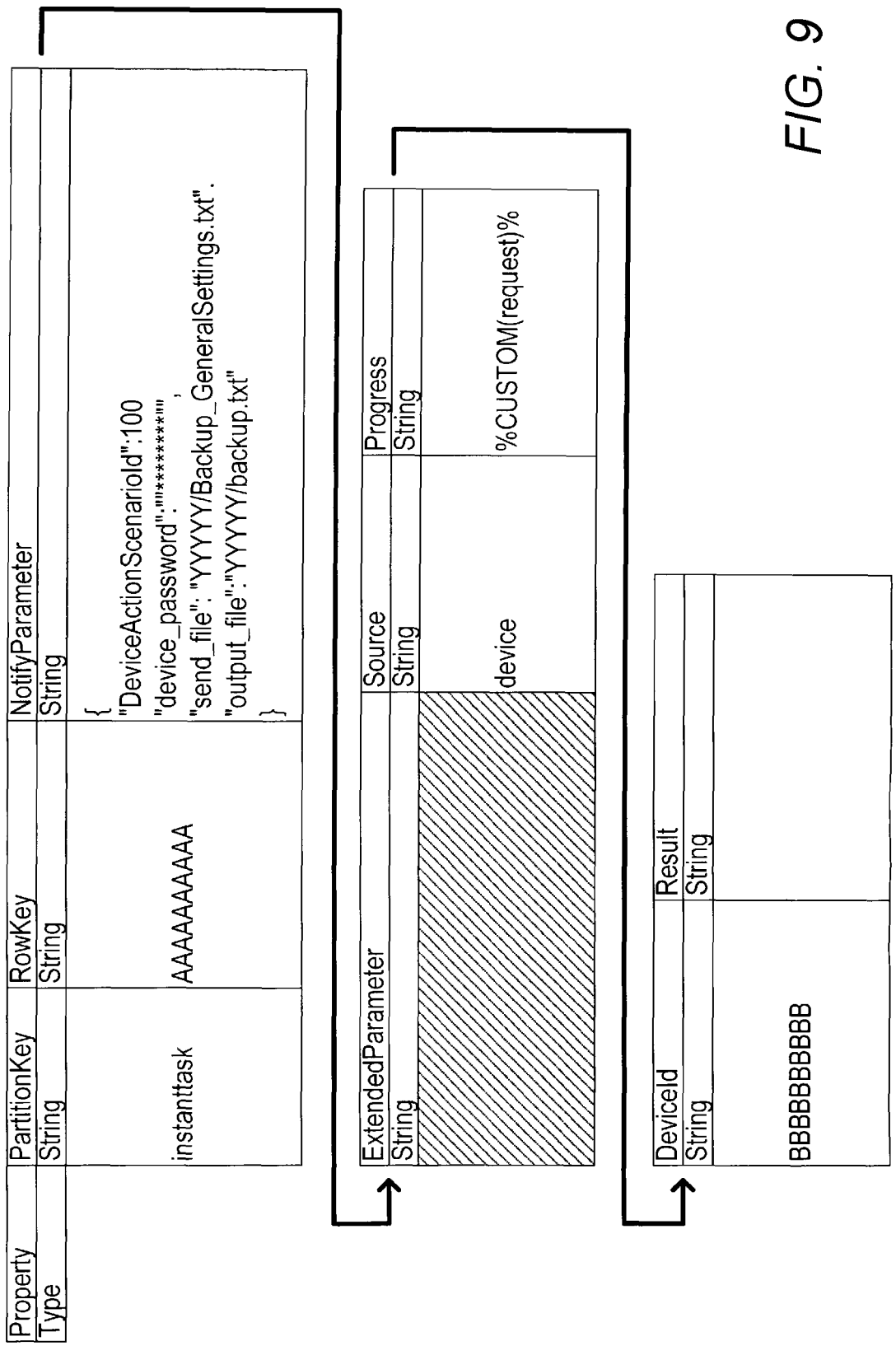
FIG. 9 is a diagram showing a second specific example of instant task instruction data.
Figure 10:
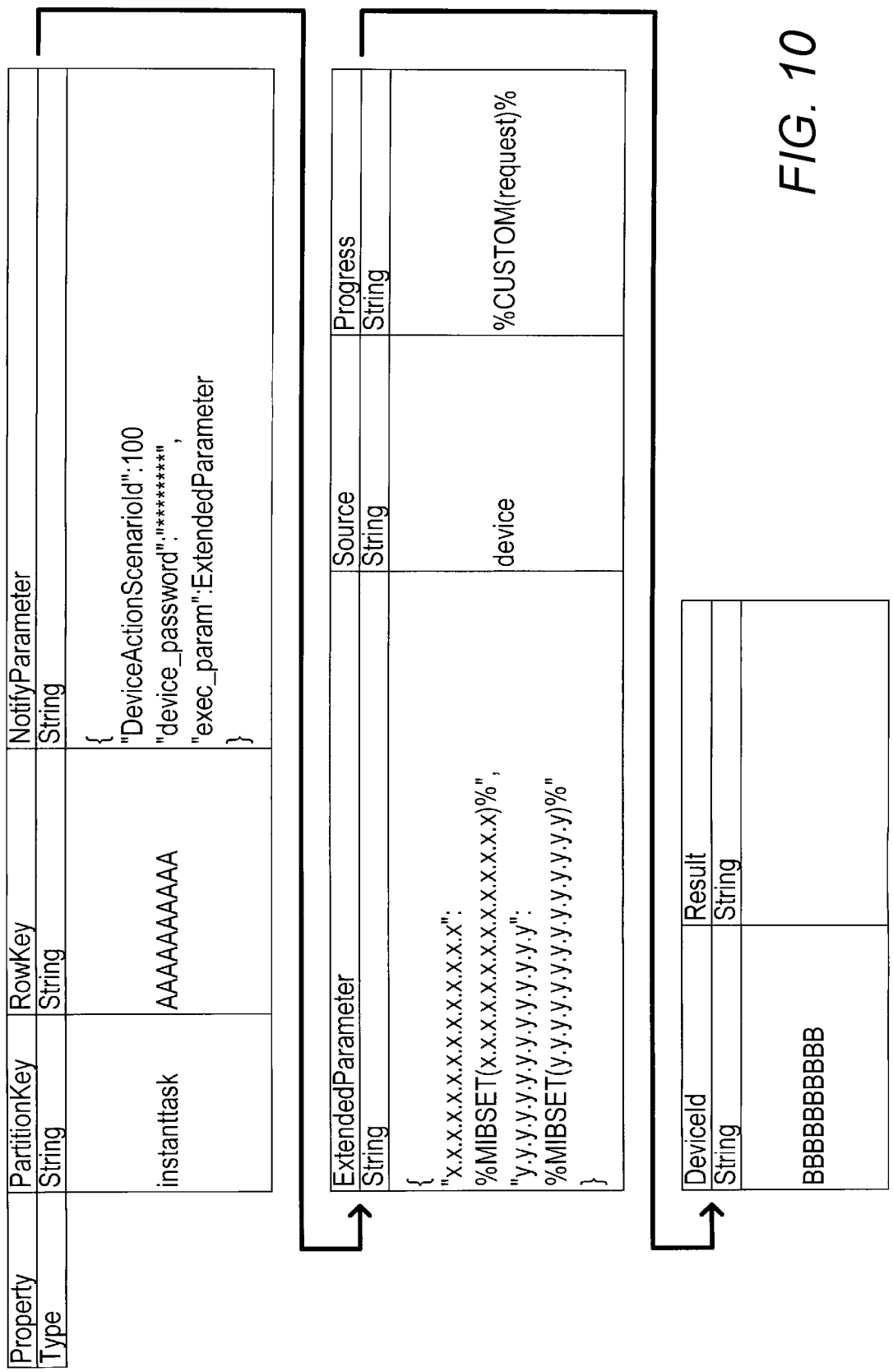
FIG. 10 is a diagram showing a third specific example of instant task instruction data.

FIGS. 9 and 10 show a specific example of instant task instruction data created when the master 2 instructs the second type terminal device 5 to execute an instant task. The task instruction data shown in FIG. 9 is different from the task instruction data shown in FIG. 7 in an instruction format in the property "Notify Parameter". The task instruction data shown in FIG. 9 is different from the task instruction data shown in FIG. 7 in that a character string "device" is stored in the property "Source".

As shown in FIG. 9, instruction contents of the instant task is designated by "send_file" and "output_file" in the property "Notify Parameter" in the instant task instruction data shown in FIG. 9. The task instruction data shown in FIG. 9 is data indicating an instruction to rewrite setting of the second type terminal device 5.

The instant task instruction data shown in FIG. 10 is different from the task instruction data shown in FIG. 9 in the instruction contents of the instant task. The task instruction data shown in FIG. 10 is different from the task instruction data shown in FIG. 9 in that the property "Extended Parameter" is used.

As shown in FIG. 9, the instruction contents of the instant task is designated by "send_file" and "output_file" in the property "Notify Parameter" in the instant task instruction data shown in FIG. 9.

As shown in FIG. 10, the execution of a task specified by a character string stored in the property "Extended Parameter" is instructed by ""exec_param": Extended Parameter" in the property "Notify Parameter" in the instant task instruction data shown in FIG. 10.

A character string "% MIBSET (x.x.x.x. . . . )%" stored in the property "Extended Parameter" in the task instruction data shown in FIG. 10 indicates instruction contents of the instant task. (x.x.x.x. . . . ) is an object ID of the MIB, and an actual object ID is displayed in a simplified manner.

(4) Scheduled Task

Next, a procedure of a scheduled task execution processing executed by the controller 31 of the client 3 and the controller 71 of the second type terminal device 5 will be described. The scheduled task execution processing is a processing repeatedly executed during the operation of the client 3 and the second type terminal device 5.

Figure 11:
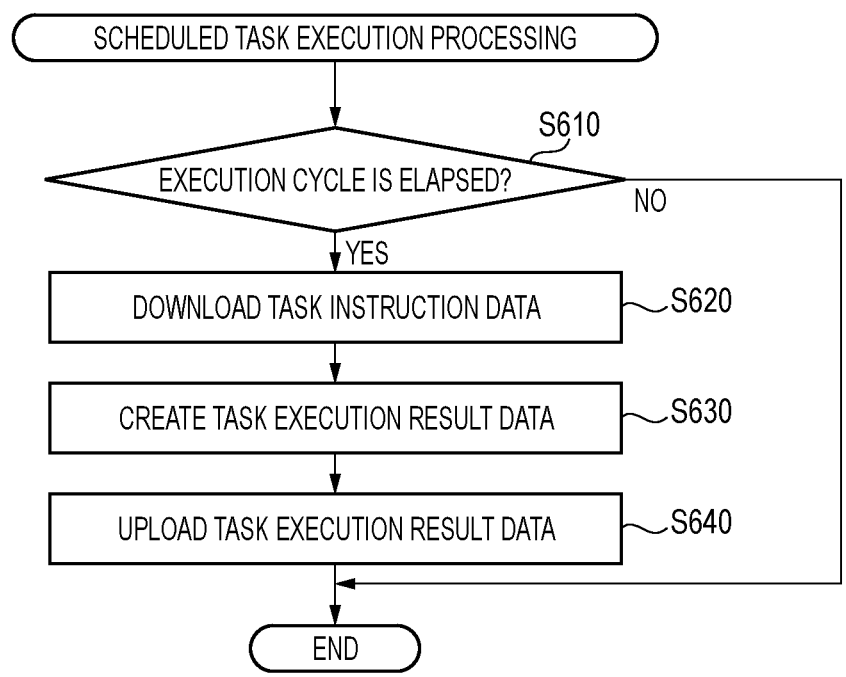
FIG. 11 is a flowchart showing a scheduled task execution processing.

When the scheduled task execution processing is executed, in S610, the CPU 41 of the controller 31 and the CPU 81 of the controller 71 first determine whether a preset execution cycle is elapsed, as shown in FIG. 11. When the execution cycle is not elapsed, the CPU 41 and the CPU 81 end the scheduled task execution processing.

On the other hand, when the execution cycle is elapsed, the CPU 41 and the CPU 81 download scheduled task instruction data from the first storage 93 of the cloud server 6 in S620. The scheduled task instruction data is uploaded to the first storage 93 of the cloud server 6 by the master 2.

In S630, the CPU 41 and the CPU 81 execute a scheduled task designated by the scheduled task instruction data, and create scheduled task execution result data indicating a result of the execution of the scheduled task. In the processing of S630 executed by the CPU 41, the first type terminal device 4 connected to the client 3 executes the scheduled task. In the processing of S630 executed by the CPU 81, the second type terminal device 5 executes the scheduled task.

In S640, the CPU 41 and the CPU 81 upload the scheduled task execution result data created in S630 to the first storage 93 of the cloud server 6, and end the scheduled task execution processing.

Figure 12:
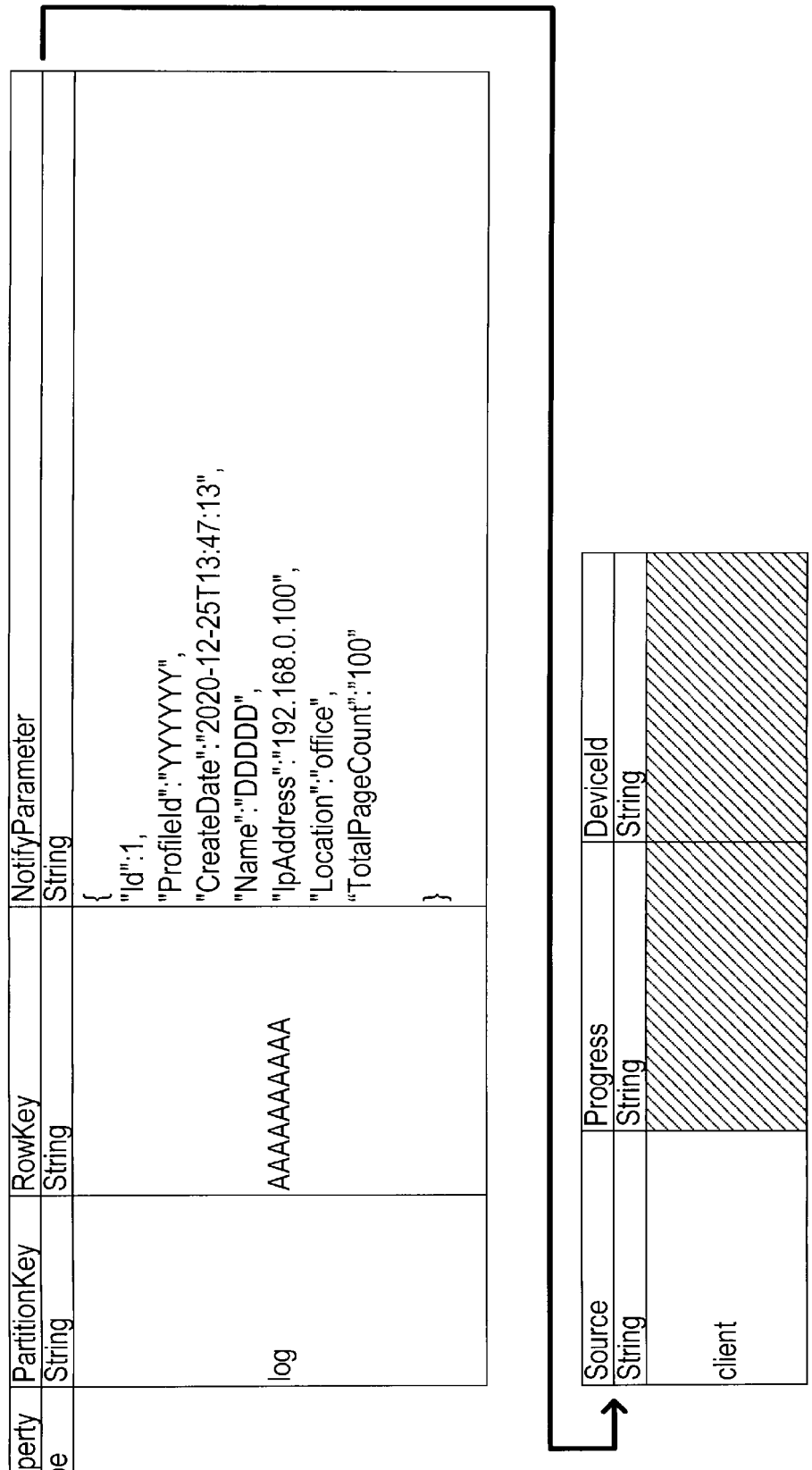
FIG. 12 is a diagram showing a first specific example of scheduled task execution result data.

FIG. 12 shows a specific example of the scheduled task execution result data created by the client 3. As shown in FIG. 12, the scheduled task execution result data is a template including a plurality of properties, and a character string is stored in each of the plurality of properties.

In the scheduled task execution result data shown in FIG. 12, "Partition Key", "Row Key", "Notify Parameter", "Source", "Progress", and "Device Id" are set as properties.

A character string indicating a type of a scheduled task is stored in the property "Partition Key". In the scheduled task execution result data shown in FIG. 12, the property "Partition Key" stores "log" that is a character string indicating that the task is a scheduled task for notifying the master 2 of an operation log (for example, the number of printed sheets, a remaining amount of consumables, and the like) of the first type terminal device 4 connected to the client 3.

A device ID for identifying the first type terminal device 4 corresponding to the scheduled task execution result data is stored in the property "Row Key". A character string described in a JSON format for indicating an execution result obtained by executing the scheduled task is stored in the property "Notify Parameter".

A character string indicating whether a creation source of the scheduled task execution result data is the client 3 or the second type terminal device 5 is stored in the property "Source". Specifically, when the creation source is the client 3, "client" that is a character string indicating that the creation source is the client 3 is stored, and when the creation source is the second type terminal device 5, "device" that is a character string indicating that the creation source is the second type terminal device 5 is stored.

Figure 13:
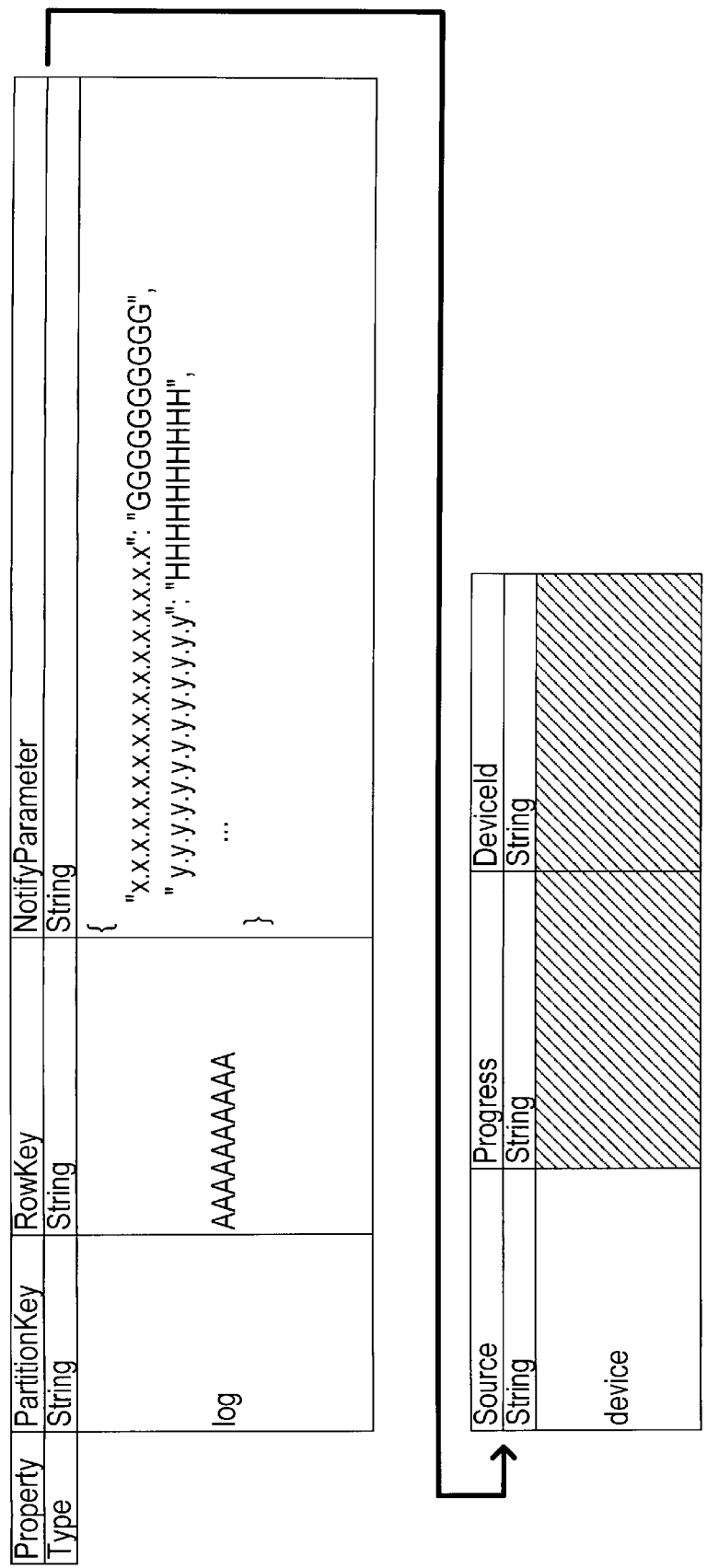
FIG. 13 is a diagram showing a second specific example of scheduled task execution result data.

The property "Progress" and the property "Device Id" are not used and are blank. FIG. 13 shows a specific example of scheduled task execution result data created by the second type terminal device 5.

The scheduled task execution result data shown in FIG. 13 is different from the scheduled task execution result data shown in FIG. 12 in the character strings stored in the property "Notify Parameter" and the property "Source".

""Id": 1", "Profiled Id": "YYYYY", and the like are stored in the property "Notify Parameter" in the scheduled task execution result data shown in FIG. 12. On the other hand, "x.x.x.x. . . .": "GGGGG . . . " and the like are stored in the property "Notify Parameter" in the scheduled task execution result data shown in FIG. 13. x.x.x.x. . . . is an object ID of a MIB, and an actual object ID is displayed in a simplified manner.

The reason why the character string stored in the property "Notify Parameter" is different between the client 3 and the second type terminal device 5 is that the client 3 may convert an object ID of the MIB into a character string such as "Id" and "Profile Id" and the second type terminal device 5 cannot convert the object ID of the MIB.

(5) Effects

The management system 1 configured as described above includes the master 2, the client 3, the first type terminal device 4, the second type terminal device 5, and the cloud server 6. The first type terminal device 4 is a terminal device communicably connected to the client 3. The second type terminal device 5 is a terminal device that is not communicably connected to the master 2 and the client 3. The cloud server 6 may communicate with the master 2, the client 3, and the second type terminal device 5.

The master 2 uploads, to the cloud server 6, instant task instruction data for a client (hereinafter referred to as first instant task instruction data) indicating contents of a processing to be executed by the first type terminal device 4. The master 2 uploads, to the cloud server 6, instant task instruction data for the second type terminal device (hereinafter referred to as second instant task instruction data) indicating contents of a processing to be executed by the second type terminal device 5.

The client 3 downloads the first instant task instruction data from the cloud server 6, causes the first type terminal device 4 to execute a first target processing that is a processing indicated by the first instant task instruction data. When the first type terminal device 4 executes the first target processing, the first type terminal device 4 uploads, to the cloud server 6, task execution result data (hereinafter, referred to as first task execution result data) indicating notification contents corresponding to the first target processing.

The second type terminal device 5 downloads the second instant task instruction data from the cloud server 6, executes a second target processing that is a processing indicated by the second instant task instruction data. When the second target processing is executed, the second type terminal device 5 uploads, to the cloud server 6, task execution result data (hereinafter, referred to as second task execution result data) indicating notification contents corresponding to the second target processing.

The master 2 downloads the first task execution result data and the second task execution result data from the cloud server 6. Then, the master 2 makes an instruction format different between the first instant task instruction data and the second instant task instruction data.

As described above, in the management system 1, the master 2 may upload the first instant task instruction data to the client 3 in an instruction format corresponding to the client 3, and may upload the second instant task instruction data to the second type terminal device 5 in an instruction format corresponding to the second type terminal device 5. Therefore, the management system 1 does not need to change the instruction format in the client 3 or the second type terminal device 5 in order to match the instruction format of the client 3 with the instruction format of the second type terminal device 5. Accordingly, the management system 1 may facilitate the construction of the management system 1 having a mixed configuration of a configuration in which the master 2 manages a terminal device via the client 3 and a configuration in which the master 2 manages a terminal device without using the client 3.

The client 3 converts the first instant task instruction data into a format that may be recognized by the first type terminal device 4, and transmits the converted data to the first type terminal device 4. The second instant task instruction data includes information (that is, the object ID of the MIB) in a format that may be recognized by both the first type terminal device 4 and the second type terminal device 5.

A plurality of functions of one constituent element in the embodiment described above may be implemented by a plurality of constituent elements, or one function of one constituent element may be implemented by a plurality of constituent elements. A plurality of functions of a plurality of constituent elements may be implemented by one constituent element, or one function to be implemented by a plurality of constituent elements may be implemented by one constituent element. A part of the configurations in the embodiment described above may be omitted. At least a part of the configurations in the embodiment described above may be added to or replaced with configurations of another embodiment.

In addition to the master 2 described above, the present disclosure may be implemented in various forms such as a system including the master 2 as a constituent element, a program for causing a computer to function as the master 2, a non-transitory tangible recording medium such as a semiconductor memory in which the program is recorded, and a terminal management method.

What is claimed is:

1. A terminal management system comprising:
   a main management device;
   a sub-management device;
   a first type terminal device that is communicably connected to the sub-management device;
   a second type terminal device that is not communicably connected to the main management device and the sub-management device; and
   a storage device that is configured to communicate with the main management device, the sub-management device, and the second type terminal device,
   wherein the main management device uploads, to the storage device, first processing instruction information indicating contents of a first target processing to be executed by the first type terminal device and second processing instruction information indicating contents of a second target processing to be executed by the second type terminal device,
   the sub-management device downloads the first processing instruction information from the storage device, causes the first type terminal device to execute the first target processing, and uploads, to the storage device, first notification information indicating first notification contents corresponding to the first target processing after the first type terminal device executes the first target processing,
   the second type terminal device downloads the second processing instruction information from the storage device, executes the second target processing, and uploads, to the storage device, second notification information indicating second notification contents corresponding to the second target processing after the second target processing is executed,
   the main management device downloads the first notification information and the second notification information from the storage device, and makes an instruction format different between the first processing instruction information and the second processing instruction information.

2. The terminal management system according to claim 1,
   wherein the sub-management device converts the first processing instruction information into a first format recognizable by the first type terminal device and transmits the converted first processing instruction information to the first type terminal device, and
   wherein the second processing instruction information includes information in a second format recognizable by both the first type terminal device and the second type terminal device.

3. The terminal management system according to claim 2,
   wherein the information in the second format includes an object identifier.

4. A non-transitory computer readable medium storing a terminal management program causing a controller provided in a main management device of a terminal management system to execute a process for managing terminals, the terminal management system including:
   the main management device;
   a sub-management device;
   a first type terminal device that is communicably connected to the sub-management device,
   a second type terminal device that is not communicably connected to the main management device and the sub-management device; and a storage device that is configured to communicate with the main management device, the sub-management device, and the second type terminal device, and the process comprising:

uploading, to the storage device, first processing instruction information that indicates contents of a first target processing to be executed by the first type terminal device and to be downloaded from the storage device by the sub-management device; and uploading, to the storage device, second processing instruction information that indicates contents of a second processing to be executed by the second type terminal device, to be downloaded from the storage device by the second type terminal device, and has an instruction format different from an instruction format of the first processing instruction information.

5. The non-transitory computer readable medium according to claim 4, wherein the process further comprises causing the sub-management device to convert the first processing instruction information into a first format recognizable by the first type terminal device and transmit the converted first processing instruction information to the first type terminal device, and the second processing instruction information includes information in a second format recognizable by both the first type terminal device and the second type terminal device.

6. A terminal management method that is executed by a main management device of a terminal management system, the terminal management system including:

the main management device;

a sub-management device;

a first type terminal device that is communicably connected to the sub-management device;

a second type terminal device that is not communicably connected to the main management device and the sub-management device; and a storage device that is configured to communicate with the main management device, the sub-management device, and the second type terminal device, and the terminal management method comprising:

uploading, to the storage device, first processing instruction information that indicates contents of a first target processing to be executed by the first type terminal device and to be downloaded from the storage device by the sub-management device; and uploading, to the storage device, second processing instruction information that indicates contents of a second target processing to be executed by the second type terminal device, to be downloaded from the storage device by the second type terminal device, and has an instruction format different from an instruction format of the first processing instruction information.

7. The terminal management method according to claim 6 further comprising:

causing the sub-management device to convert the first processing instruction information into a first format recognizable by the first type terminal device and transmit the converted first processing instruction information to the first type terminal device;

wherein the second processing instruction information includes information in a second format recognizable by both the first type terminal device and the second type terminal device.

* * * * *